W. F. EMERSON.
COASTER BRAKE.
APPLICATION FILED APR. 3, 1914.
1,263,873.
Patented Apr. 23, 1918.
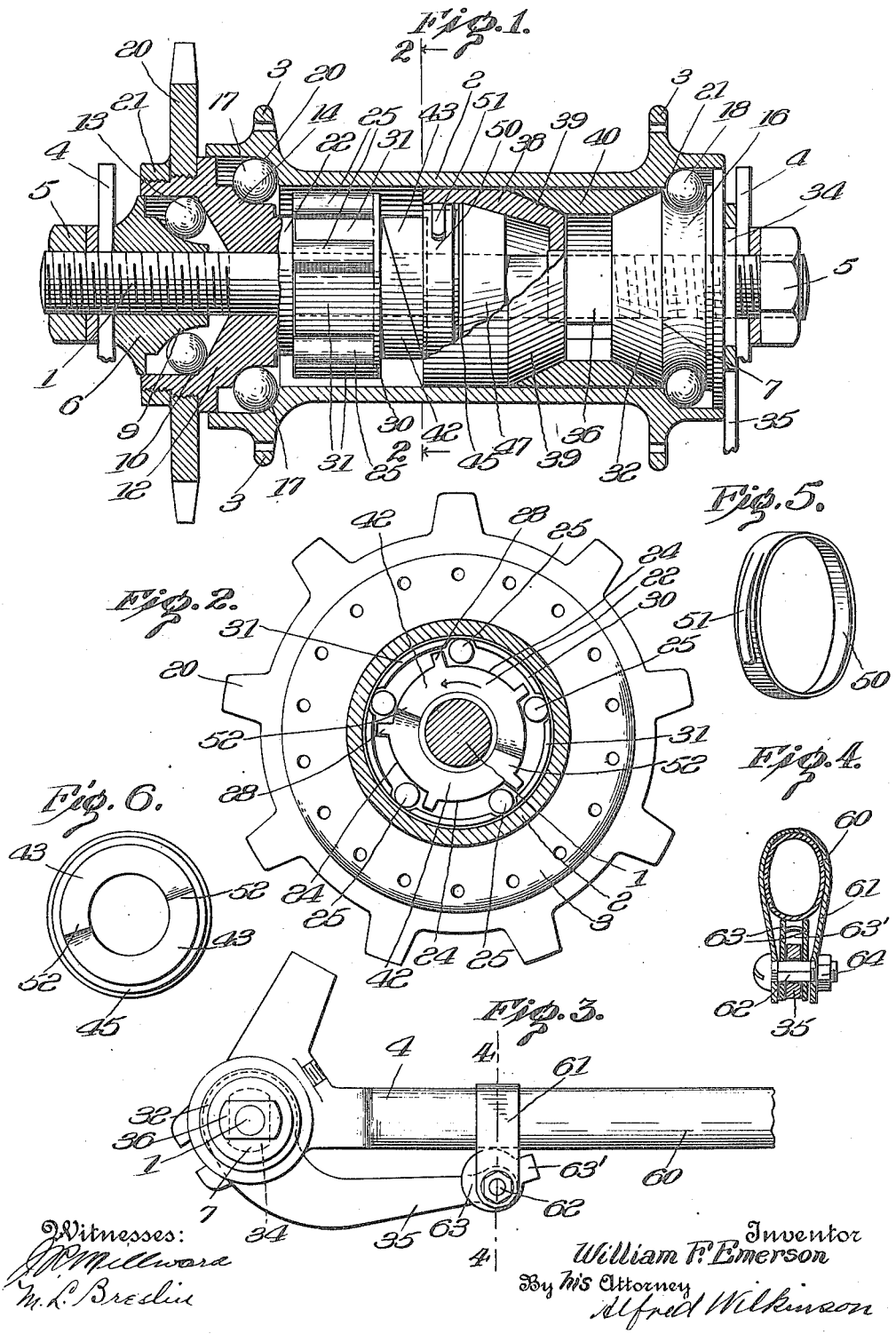

UNITED STATES PATENT OFFICE.

WILLIAM F. EMERSON, OF BUFFALO, NEW YORK.

COASTER-BRAKE.

1,263,873.　　　　　Specification of Letters Patent.　　Patented Apr. 23, 1918.

Application filed April 3, 1914. Serial No. 829,210.

*To all whom it may concern:*

Be it known that I, WILLIAM F. EMERSON, a citizen of the United States, residing in Buffalo, in the county of Erie and State of New York, have invented new and useful Improvements in Coaster-Brakes, of which the following is a specification.

This invention relates to a driving and braking mechanism particularly designed for embodiment in the well known type of device for use on bicycles and the like and known generally as "coaster brake." In this form of device the parts are arranged to form the hub of the wheel and to provide the bearings therefor. In operation on the forward rotation of the driving member a clutch effects engagement to couple the wheel thereto while a reverse rotation of the driving member operates a suitable brake to cause braking of the hub, and the device is adapted when the driving member is at rest to permit the wheel to rotate freely on its bearings.

The coaster brake of my improved design is reliable and efficient in performing the functions described and is of improved construction affording a greatly increased braking surface with consequent increase in durability. A further feature thereof resides in an improved holding means for the braking parts by the employment of which these parts are rigidly secured to the frame without opportunity for play or lost motion.

These and other desirable features of my improved device will be readily understood by reference to the accompanying drawing wherein the reference characters of this description are applied to like parts in the several views.

In the drawing Figure 1 is a vertical longitudinal sectional view of a brake constructed to embody the features of my invention. Fig. 2 is a vertical cross-sectional view on line 2—2 of Fig. 1. Fig 3 is a view in side elevation of the holding parts of my invention. Fig. 4 is a detail sectional view thereof on line 4—4 of Fig. 3. Fig. 5 is a perspective view of the lag spring and Fig. 6 is a view in end elevation of the brake operating member.

In the embodiment of my invention shown, 1 indicates the usual stationary axle or spindle for the wheel hub, rigidly supported in the rear forks or frame members 4 of a bicycle, as shown, and threaded at its end portions to receive the securing nuts 5—5 whereby it is clamped in position. The usual hub-barrel 2, forming a casing for the parts is journaled to rotate about the axle in the manner to be described and has integral therewith the usual spoke flanges 3—3.

Threaded to each end of the axle are the inner bearing member 6, at the left, and the brake-bearing member 7 at the right. The former bearing member 6 is provided with a conical bearing portion 9, coacting with an internal cup-cone or ball-race 10, of a driving member 12, in forming a raceway for interposed bearing balls 13 whereby the driving member is journaled to rotate on the member 6. The driving member 12 also is formed to provide the exterior conical bearing portion 14 and the brake bearing member is provided with an exterior bearing groove 16. Riding on the bearing portion 14 and in the groove 16 are the respective ball-bearings 17 and 18 for the hub 2, the hub being formed with the outwardly directed curved surfaces or ball-races 20—21 complemental to the bearing 14 and groove 16 in providing raceways for the ball-bearings 17 and 18. Thus the hub is journaled at one side upon the driving member 12 and at the opposite side upon the brake-bearing member 7.

Normally the hub barrel is permitted to rotate independently and freely on its bearings 17 and 18 which occurs when the wheel hub moves forwardly with respect to the operating member or when the operating member is at rest. However when the operating member is rotated means are provided to be actuated thereby on its forward rotation to effect the coupling or locking of the hub to the operating member to be propelled therewith while on the reverse movement of the operating member a brake mechanism is actuated frictionally to engage the hub thereby to retard or stop the rotation of the wheel.

Operating means are shown for the purpose of rotating the operating member 12 forwardly for driving or rearwardly for braking, in this instance being in the form of the customary sprocket wheel 20 threaded onto the operating member and secured by locking nut 21. An inwardly extended cam portion 22 of this operating member is formed on its periphery with a series of cam surfaces 24 arranged to act upon binding rollers 25 in a manner to effect coupling of the operating member and the hub when the former is moved forwardly with relation to the latter. The surfaces are suitably distanced from the inner periphery of the hub to form in conjunction therewith inclined slots in which the rollers are positioned and proportioned to bind when they ride up the cam surfaces into the smaller end of the slots and to be of a loose fit so that they will ride freely when in the larger end of the slots. Stops or projections 28 are integrally formed on the cam portion 22 to engage the rollers when in the latter position. Thus upon revolving the wheel hub forwardly with relation to the rollers they will assume a released position in the larger end of the slots so that the wheel is permitted to rotate freely, this being the condition which prevails when the propelling force is not communicated through the operating member to the hub so that the wheel will then rotate freely to permit of the vehicle coasting independent of its driving connections. To insure uniform action of the cams on the rollers a spacing ring 30 is provided with distance flanges 31 interposed between the respective rollers whereby they are held in equally spaced position.

On the reverse or back-pedaling rotation of the operating member, it is arranged to effect the operation of a suitable braking device. The improved braking device here shown forms an important part of my invention and gives a large area of braking surface. The parts thereof comprise an integral, conical portion 32 formed on the brake bearing-member 7. The member 7 has formed on its outer face a squared shoulder 34 engaged by a similarly apertured securing arm 35 and therefore is held from rotation. Projecting inwardly from the member 7 is an integral squared sleeve portion 36 entering a squared aperture in a conical brake-sleeve 38 having on its exterior a conical portion 39 inclined reversely with reference to the surface 32 and conjointly therewith providing stationary brake expanding surfaces. A split friction sleeve 40 is interposed between the interior of the hub-barrel 2 and the conical surfaces 32—39 and has co-acting inclined interior surfaces to be engaged by the surfaces 32 and 39 to cause it to be expanded into frictional engagement with the internal surface of the hub barrel.

The expanding of the friction sleeve is effected by the longitudinal movement of the brake-sleeve 38, movement being imparted thereto from the driving member 12 on its backward rotative movement. To that end the driving member cam portion 22 is provided with laterally acting cams 42 on its inner face engaging coacting similar cam 43 integrally formed on a brake operating member 45 slidably mounted on the axle 1 and having a conical surface 47 to engage the interior surface of the brake-sleeve 38 to move the latter for expanding the ring 40. The engagement of the conical surface 47 with the coacting surface of sleeve 38 holds the brake-operating member 45 from rotative movement thus insuring relative movement of the cams 42—43 and the resulting longitudinal movement of the member 45 to operate the brake. Initially to insure the relative movement of the cams 42—43 a retarding friction ring 50 is arranged frictionally to engage both the member 45 and the non-rotary member 38. To perform this function the ring 50 is formed with a bent up tongue 51 to engage the interior of part 38. The inclined cams 42—43 terminate at their high portions in abrupt abutting shoulders 52 which by their engagement during the driving, forward, movement of the operating member 12 rotate the brake operating member 45 therewith without imparting longitudinal force thereto so that the braking parts are released.

The operation, as will be understood from the foregoing is to effect a direct coupling of the driving-member 12 with the hub 2 through the rollers 25 upon the forward or propelling movement of that member. Upon its reverse movement the action of cams 42—43 will cause the brake-ring or friction sleeve 40 to be expanded into braking engagement with the hub and upon relieving the driving member 12 of the driving or braking force the wheel hub is permitted to rotate freely for coasting. The devices so constructed are possessed of great strength and are quickly responsive in their action both for driving and braking. The form of the parts for the latter purpose is designed to produce a uniform braking action for it will be seen that the friction sleeve has frictional engagement with both the hub, externally, and the stationary members, internally, so that there is present a differential braking engagement insuring uniformity in its action.

An additional feature of the invention is illustrated in Figs. 3 and 4 and consists in an improved holding device for the stationary braking parts. As shown, the holding arm 35 is forwardly extended and secured to the horizontal frame member 60 of the lower rear fork of the cycle by means of a clip or yoke 61 fitting over the member 60 and secured to the end of the arm by a bolt 62. This manner of securing the holding arm is a customary arrangement and the use of large clips readily accommodate for attachment to frame members of different circumference. This arrangement however results in an undesirable play or free movement of the arm having a tendency to loosen the securing nuts and to impair the uniformity of the braking action.

To remedy this objectionable feature and still to retain the desirable feature of adapting the holding device to frame members of various sizes I have designed means for conveniently taking up the play and holding the arm and brake-members perfectly rigid. It consists in the arrangement, as shown, wherein an eccentric is fitted on to the bolt 62 to be turned into clamping engagement with the under side of the frame member 60. A desirable form of double eccentric 63 is illustrated which is economically stamped in one piece and bent over simultaneously forming a short lug or arm 63' whereby the eccentric may be turned to tighten it by the use of a wrench or other tool. As a further feature of convenience in taking up the play by means of the eccentrics, the bolt is shown squared for the locking of the eccentrics thereto. Upon turning the bolt by a screw driver the eccentrics may thus be tightened and thereafter upon tightening the locking nut 64 it will be secured in its adjusted position.

Having described my invention I claim:

1. In a driving and braking mechanism, the combination with the hub and the axle, of a driving member suitably journaled, radially active means operative to secure the driving member and the hub together on the forward rotation of the former, a stationary brake member having an external braking surface, an expansible friction sleeve loosely interposed between the hub and the brake member and provided with external and internal braking surfaces to have frictional braking engagement with both and means operative on the backward rotation of the driving member to cause frictional engagement of the friction sleeve with both the hub and the stationary brake member to produce a braking effect on the former.

2. In a driving and braking mechanism the combination with the hub and the axle, of a driving member suitably journaled, means operative to secure the driving member and the hub together on the forward rotation of the former, a non-rotatable brake member having an external braking surface, an expansible friction sleeve loosely interposed between the hub and the brake member and provided with external and internal braking surfaces to have frictional braking engagement with both and means operative on the backward rotation of the driving member to cause frictional engagement of the friction sleeve with both the hub and the non-rotatable brake member to produce a braking effect on the former.

3. In a driving and braking mechanism the combination with the hub and the axle, of a driving member suitably journaled, radially acting means operative to couple the driving member and the hub to rotate together on the forward rotation of the former, a stationary brake-member having an external tapered braking surface, a co-acting movable brake member having an opposed tapered braking surface, means to secure the movable brake-member from rotative movement, an expansible friction sleeve interposed between the brake members and provided with interior tapered braking surfaces complementary to the tapered surfaces of the brake-members and means operative on the backward rotation of the driving member to move the movable brake-member relative to the stationary brake member to cause frictional engagement of the members with the friction sleeve and between the sleeve and the hub whereby the latter is retarded.

4. In a driving and braking mechanism the combination with the hub and the axle, of a driving member suitably journaled, radially acting means operative to couple the driving member and hub to rotate together on the forward rotation of the former, a stationary brake member having a tapered braking surface, a coacting movable brake member having an opposed tapered braking surface, means to secure the movable brake-member from rotative movement, an expansible friction sleeve loosely interposed between the brake members, a brake-operating member operative to move the movable brake-member relative to the stationary brake-member to expand the friction sleeve into braking engagement, means to retard rotative movement of the brake-operating member relative to the movable brake-member and actuating means operative on the backward rotation of the driving member to move the brake-member to cause frictional braking engagement for the braking of the hub.

5. In a driving and braking mechanism, the combination with the hub and the axle, of a driving member suitably journaled, means operative to couple the driving member and the hub to rotate together on the forward rotation of the former, laterally acting cam surfaces on the driving member, a stationary brake-member having an external tapered braking surface, a co-acting movable brake member having an opposed tapered braking surface, a squared inwardly extended portion on the stationary brake-member entering a squared aperture in the movable member whereby the latter is held from rotative movement, an expansible friction sleeve loosely interposed between the brake members and provided with interior coacting brake surfaces, a brake operating member provided with coacting cam surfaces to engage the driving member cam surfaces to effect lateral movement of the movable brake member on the backward rotation of the driving member and arranged to engage the driving member to rotate therewith on the forward rotation thereof and means to retard the rotative movement of the brake operating member.

6. In a driving and braking mechanism the combination with the hub and the axle, of a driving member suitably journaled and provided with a laterally extended cam portion having radially acting cam surfaces, binding rollers interposed between the hub and the cam surfaces to couple the hub and driving member to rotate together on the forward rotation of the latter, a stationary brake member, an expansible friction sleeve interposed between the hub and the brake member to have frictional engagement with both, laterally acting cam surfaces on the driving member cam portion and means actuated thereby on the backward rotation of the driving member to cause frictional engagement of the friction sleeve with both the hub and the stationary brake member to produce a braking effect on the former.

7. In a driving and braking mechanism the combination with the hub and the axle, of a driving member suitably journaled and provided with a laterally extended cam portion having radially acting cam surfaces, binding rollers interposed between the hub and the cam surfaces to couple the hub and the driving member to rotate together on the propelling rotation of the latter, shoulders on the cam portion to engage the rollers when released on the backward rotative movement of the driving member, a spacing ring having distance flanges to position the rollers, a stationary brake-member, an expansible friction sleeve, interposed between the hub and the brake member to have frictional engagement with both, laterally acting cam surfaces on the driving member cam portion and means actuated thereby on the backward rotation of the driving member to cause frictional engagement of the friction sleeve with both the hub and the stationary brake-member to produce a braking effect on the former.

8. In a driving and braking mechanism, the combination with the hub and the axle, of a driving member suitably journaled and provided with a laterally extended cam portion having radially acting cam surfaces, binding rollers interposed between the hub and the cam surfaces to couple the hub and driving member to rotate together on the propelling movement of the latter, shoulders on the cam portion to engage the rollers when released on the backward rotative movement of the driving member, a spacing ring having distance flanges arranged to position the rollers, a stationary brake member having a tapered braking surface, a coacting movable brake-member having an opposed tapered braking surface, means to secure the movable brake member from rotative movement, an expansible friction sleeve interposed between the brake members, laterally acting cam surfaces on the driving member cam portion, a brake operating member arranged to be actuated by the lateral cam surfaces to move the movable brake member relative to the stationary brake-member to cause frictional braking engagement of the friction-sleeve and a retarding spring interposed between the brake operating member and the movable brake-member to insure of the operation of the former.

9. In a driving and braking mechanism, the combination with the hub and the axle, of a driving member suitably journaled, means operative to secure the driving member and the hub together on the propelling rotation of the former, braking means for the hub arranged to be actuated upon a reverse rotation of the driving member, said braking means having a stationary member, a holding arm secured to the stationary member, a holding clip secured to the arm and attachable to a stationary frame member and an eccentric distance element arranged to engage the frame member and to be adjustable to effect the rigid clamping of the arm to the frame member.

10. In a driving and braking mechanism, the combination with the hub and the axle, of a driving member suitably journaled, means operative to secure the driving member and the hub together on the propelling rotation of the former, braking means for the hub arranged to be actuated upon a reverse rotation of the driving member, said braking means having a stationary member, a holding arm secured to the stationary member, a holding clip secured to the arm and formed to be attachable to a stationary frame member, an eccentric distance element arranged interposed between the arm and the frame member and adjustable to effect rigid clamping of the arm to the frame member, means for adjusting the distance element and means for securing it in its adjusted position.

11. In a driving and braking mechanism, the combination with the hub and the axle, of a driving member suitably journaled, means operative to secure the driving member and the hub together on the propelling rotation of the former, braking means for the hub arranged to be actuated upon a reverse rotation of the driving member, said braking means having a stationary member, a holding arm secured to the stationary member, a holding clip formed to be attachable to a stationary frame member, a securing bolt fitted to the arm and to the clip, an eccentric distance element carried by the bolt to be adjustable to effect rigid clamping of the arm to the frame member and means to secure the eccentric element in adjusted position.

12. In a driving and braking mechanism, the combination with the hub and the axle, of a driving member suitably journaled, means operative to secure the driving member and the hub together on the propelling rotation of the former, braking means for the hub arranged to be actuated upon a reverse rotation of the driving member, said braking means having a stationary member, a holding arm secured to the stationary member, a holding clip formed to be attachable to a stationary frame member, a securing bolt journaled in the arm and in the clip, said bolt having a squared portion, an eccentric distance element fitted to the squared portion of the bolt to be adjustable therewith to effect rigid clamping of the arm to the frame member, a lever extension on the eccentric element and means to secure the eccentric element in adjusted position.

13. In a driving and braking mechanism, the combination with the hub and the axle, of a driving member suitably journaled, means operative to secure the driving member and the hub together on the propelling rotation of the former, braking means for the hub arranged to be actuated upon a reverse rotation of the driving member, said braking means having a stationary member, a holding arm secured to the stationary member, a looped holding clip formed to be attachable to a stationary frame member, a securing bolt fitted to the arm and to the clip, said bolt having a squared portion, an eccentric distance element fitted to the squared portion of the bolt, said element comprising double eccentrics integrally formed and arranged in opposite sides of the arm and adapted to effect rigid clamping of the arm to the frame member and means to secure the distance element in position.

14. In a driving and braking mechanism, the combination with the hub and the axle, of a driving member suitably journaled, means operative to secure the driving member and the hub together on the propelling rotation of the former, braking means for the hub arranged to be actuated upon a reverse rotation of the driving member, said braking means having a stationary member, a holding arm secured to the stationary member, a looped holding clip formed to be attachable to a stationary frame member, a securing bolt fitted to the ends of the clip and to the arm whereby they are connected, an eccentric distance element fitted to the bolt, said element comprising double eccentrics integrally formed with a lever extension and arranged with the eccentrics on opposite sides of the holding arm, said distance element being adapted to effect rigid clamping of the arm to the frame member and means to secure the distance element in position.

15. In a driving and braking mechanism, the combination with the hub and the axle, of a driving member suitably journaled, radially acting cam surfaces on the drive member, means engaged by said surfaces for coupling the drive member and the hub upon the forward rotation of the former, a stationary brake member having a tapered braking surface, an expansible friction sleeve interposed between the hub and the brake member, a laterally movable brake member and means operative on the backward rotation of the driving member to actuate the movable brake member to cause frictional engagement both externally and internally of the friction sleeve to produce a braking effect on the hub, substantially as described.

16. In a driving and braking mechanism, the combination with the hub and the axle, of a driving member suitably journaled, means operative to secure the driving member and the hub together on the forward rotation of the former, nonrotatable brake actuating means, laterally acting means operative on the backward rotation of the driving member to actuate the latter means to set the brake, and an expansible friction sleeve interposed between the hub and the brake actuating means to have frictional braking engagement both with the hub and with the actuating means substantially as described.

In testimony whereof I have signed my name to this specification in the presence of two subscribing witnesses.

WILLIAM F. EMERSON.

Witnesses:
ROSE H. OWEN,
BERTRAM C. CANDEE.